(12) United States Patent
Hai et al.

(10) Patent No.: US 9,941,610 B1
(45) Date of Patent: Apr. 10, 2018

(54) EXPANDABLE DISTRIBUTION BLOCK

(71) Applicant: EDGE Holdings, LLC, Phoenix, AZ (US)

(72) Inventors: Wang Hai, Ningbo (CN); Larrry Vansickel, Phoenix, AZ (US); Zhou Liang, Ningbo (CN)

( * ) Notice: Subject to any disclaimer, the term of this patent is extended or adjusted under 35 U.S.C. 154(b) by 0 days.

(21) Appl. No.: 15/483,832

(22) Filed: Apr. 10, 2017

(30) Foreign Application Priority Data

Dec. 7, 2016 (CN) .......................... 2016 1 1113598

(51) Int. Cl.
*H01R 13/68* (2011.01)
*H01R 9/24* (2006.01)

(52) U.S. Cl.
CPC ........... *H01R 9/245* (2013.01); *H01R 9/2408* (2013.01)

(58) Field of Classification Search
CPC .... H01R 13/68; H01R 9/2408; H01R 13/514; H01R 9/245; H01H 85/2035; H01H 2085/208
USPC ............... 439/717, 620.26, 620.27, 507, 510
See application file for complete search history.

(56) References Cited

U.S. PATENT DOCUMENTS

| | | | | |
|---|---|---|---|---|
| 1,046,465 A * | 12/1912 | Hoyt | ...................... | H01R 31/08 324/126 |
| 2,786,162 A * | 3/1957 | Ballou | ................... | H02B 1/056 361/634 |
| 4,345,806 A * | 8/1982 | McHenney | .............. | H01R 4/30 439/510 |
| 4,722,701 A | 2/1988 | Bradt | | |
| 6,022,247 A * | 2/2000 | Akiyama | ............ | B60R 16/0238 439/701 |
| 6,677,527 B2 * | 1/2004 | Brannmark | ............ | H01R 11/01 148/432 |
| 6,878,004 B2 | 4/2005 | Oh | | |
| 7,223,129 B1 * | 5/2007 | Lopez | ...................... | H01R 9/24 174/59 |
| 2003/0040226 A1 * | 2/2003 | Lee | ...................... | H01R 13/514 439/717 |
| 2004/0166727 A1 * | 8/2004 | Ling | ..................... | H01M 2/202 439/507 |
| 2008/0020647 A1 * | 1/2008 | Carter | .................... | H01H 85/20 439/620.27 |

* cited by examiner

*Primary Examiner* — Gary Paumen
(74) *Attorney, Agent, or Firm* — Keith L. Jenkins, Registered Patent Attorney, LLC; Keith L. Jenkins

(57) ABSTRACT

A distribution block element having dual-level opposed input and output couplings and integral mechanical connectors to additional adjacent distribution block elements, allowing expansion by addition of distribution block elements. First levels of the couplings are spaced apart for a fuse of a first size and the second, lower levels of the couplings are spaced apart for a fuse of a second size, and for direct flat plate conductors. When two elements are connected adjacently, the spacing between the second level of adjacent couplings is the same as the spacing between the second level of opposed couplings in each element. Thus, the flat plate conductors can be used both for electrically connecting opposed input and output couplings and for electrically connecting input couplings of adjacent elements. Notches in the flat plate connectors receive fasteners and two flat plate connectors can be juxtaposed to receive the same fastener without stacking.

16 Claims, 17 Drawing Sheets

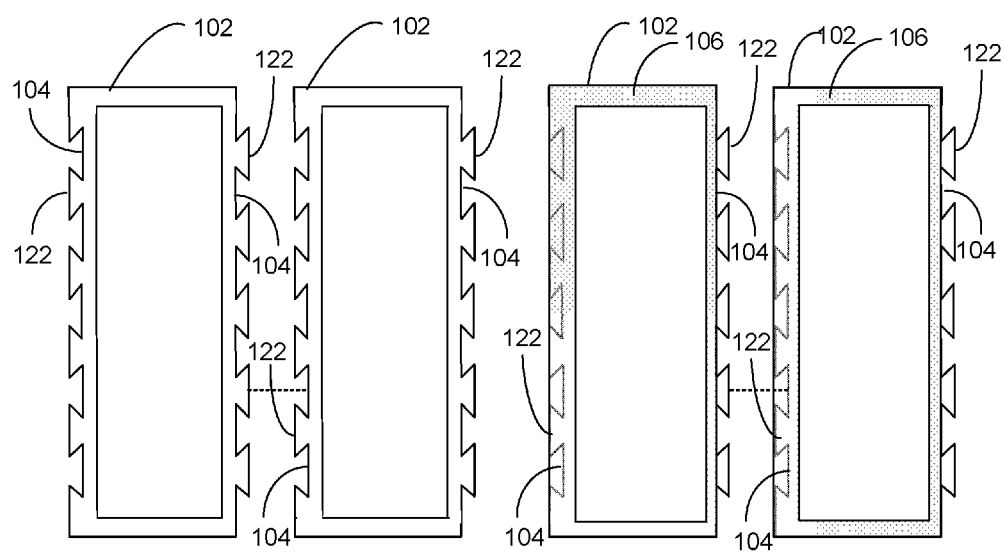
FIG. 29   FIG. 30
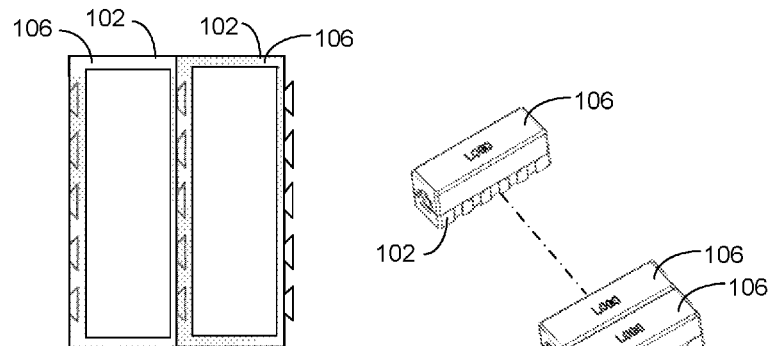
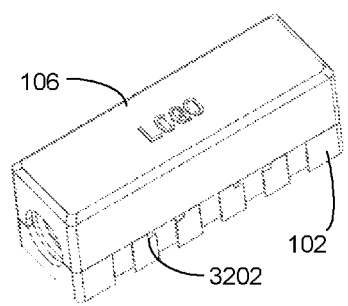
FIG. 31
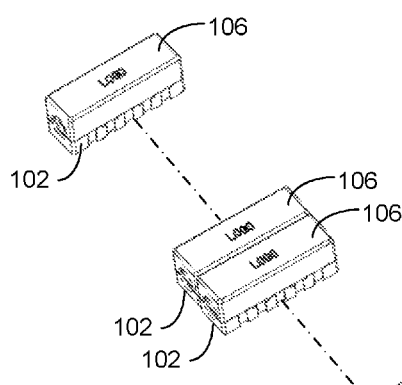
FIG. 32   FIG. 33

EXPANDABLE DISTRIBUTION BLOCK

RELATED APPLICATION

The present invention claims the benefit, under the Paris Treaty, of Chinese patent application serial number 201611113598.0 filed on Dec. 7, 2016 to two common inventors.

FIELD OF ART

The present invention relates to an expandable distribution block for distributing electrical power. The present invention more particularly relates to distribution blocks made of one or more identical discrete elements that are mechanically and electrically connectable.

BACKGROUND OF THE INVENTION

Distribution blocks of conventional design include single blocks of fixed size with a plurality of electrical connections for electrical inputs and outputs. Some fused distribution blocks provide a frame or housing within which more or fewer fuses or conductors may be installed, but which are not expandable beyond the frame or housing. What is needed is a distribution block that is variable in size and interconnect ability to adapt to a wide variety of uses.

SUMMARY OF THE INVENTION

The invention includes discrete elements, each of which is mechanically interconnectable to other such discrete elements by at least one integral mechanical connector. Each element may receive and fasten one input and one output conductor at respective input and output blocks on opposed ends of each element. The input and output blocks are identical mirror images of each other, and so may used interchangeably. Between the input and output blocks each element may receive one of a flat rigid metal electrical conductor, an ANL fuse, or a mini-ANL fuse. The elements are dimensioned such that the flat metal electrical conductor can also be used to electrically connect adjacent mechanically connected elements. The advantages of the present invention include unrestricted expansion size, adaptability to different gauges of input and output wires, the same conductors may be used for conductors along and between elements, useful for an ANL fuse, a mini-ANL fuse, or a flat conductor through the same element, compact housing, and multiple independent circuits in one block.

DESCRIPTION OF THE FIGURES OF THE DRAWINGS

The present invention will hereinafter be described in conjunction with the following drawing figures, wherein like numerals denote like elements.

FIG. 29 is a top plan view illustrating an exemplary embodiment of the exemplary mechanical connectors of the expandable distribution blocks of FIG. 5, according to a preferred embodiment of the present invention;

FIG. 30 is a top plan view illustrating an exemplary embodiment of the exemplary mechanical connectors of the expandable distribution blocks of FIG. 5, according to a preferred embodiment of the present invention;

FIG. 31 is a top plan view illustrating an exemplary embodiment of the exemplary mechanical connection of the expandable distribution blocks of FIG. 5, according to a preferred embodiment of the present invention;

FIG. 32 is a top-front perspective view illustrating an exemplary embodiment of the base and cap of the exemplary expandable distribution block of FIG. 1, according to a preferred embodiment of the present invention; and FIG. 33 is a top-front perspective view illustrating an exemplary embodiment of the bases and caps of the exemplary expandable distribution blocks, according to a preferred embodiment of the present invention.

DETAILED DESCRIPTION OF THE INVENTION

Figure 1:
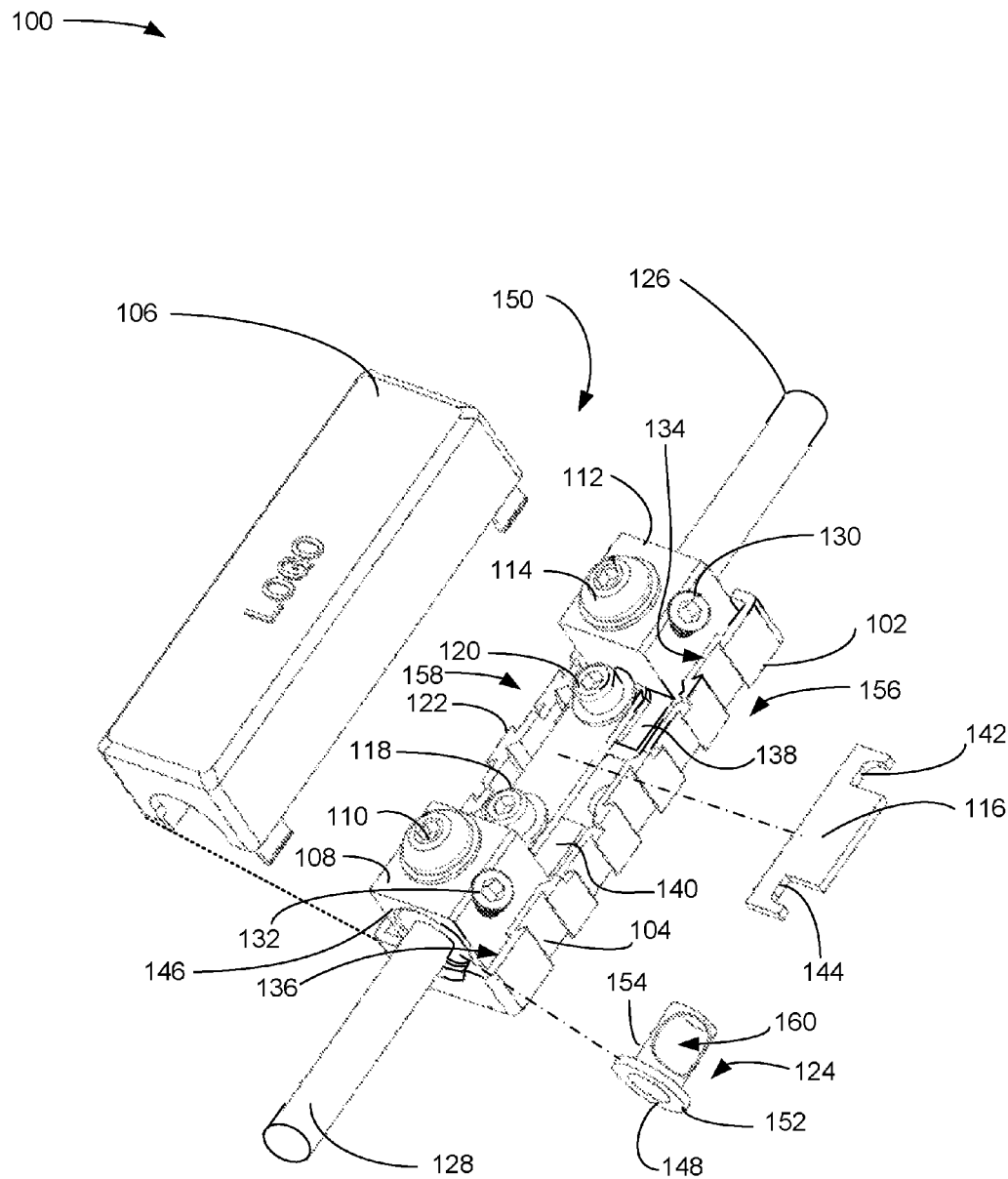
FIG. 1 is an exploded perspective view illustrating an exemplary embodiment of an expandable distribution block, according to a preferred embodiment of the present invention.

FIG. 1 is an exploded perspective view illustrating an exemplary embodiment of an expandable distribution block 100, according to a preferred embodiment of the present invention. Expandable distribution block 100 includes a single element 150 which includes a base 102, an input coupling 108, and an opposed output coupling 112. The input coupling 108, and an opposed output coupling 112 receive and couple to first and second set screws 128 and 130, first and second large fuse fasteners 110 and 114, and first and second small fuse fasteners 118 and 120. Input coupling 108 and output coupling 112 are electrically conductive blocks and each has an extended foot 140 and 138, respectively, which is preferably of one piece with input coupling 108 and output coupling 112, respectively. First and second small fuse fasteners 118 and 120 fasten to a complimentary fastener elements 604 (see FIG. 6, exemplified as a threaded holes, one of two labeled) in first and second extended feet 140 and 138, respectively. The distance between first and second extended feet 140 and 138 is predetermined to accommodate mini-ANL fuses 402 (see FIG. 4) and flat plate conductors 116. First and second large fuse fasteners 110 and 114 fasten to respective first and second complimentary fastener elements 308 and 310 (see FIG. 3), exemplified as threaded holes, in input coupling 108 and output coupling 112, respectively. First and second set screws 132 and 130 in input coupling 108 and output coupling 112, respectively, are shown partially extended, but are flush with respective input coupling 108 and output coupling 112 when completely installed. First and second set screws 132 and 130 are electrically conductive and secure input electrical conductor 128 and output electrical conductor 126, respectively, in input coupling 108 and output coupling 112, respectively. Input electrical conductor 128 and output electrical conductor 126 may be insulated wires with end portions stripped such that bare wire is received in input coupling 108 and output coupling 112, respectively. Input coupling 108 and output coupling 112 are identical but arranged in opposing orientation and fastened to base 102.

Base 102 couples to a snap-fit cap 106. Base 102 preferably has a central countersunk fastener opening 302 (see FIG. 3) for securing the base 102 to an environmental surface. A first long side 156 of base 102 has five dove tail cavities 104 and four dovetail extensions 122, while the opposing long side 158 has five dovetail extensions 122 and four dovetail cavities 104. Dovetail cavities 104 and dovetail extensions 122 are of one piece with the remainder of the base 102. Sliding a dovetail extension 122 into a dovetail cavity 104 creates a dovetail joint 104, 122. By alignment, first long side 156 of base 102 is complimentary to second long side 158 of base 102, such that adjacent discrete units 150 can be mechanically coupled together using the dovetail joints 104, 122. This will be further discussed in regard to FIG. 29-FIG. 31. In a particular embodiment, more or fewer (but at least one) integral complimentary mechanical connectors (such as dovetail joints 104, 122) may be used.

In expandable distribution block 100, single element 150 supports a flat plate conductor 116 and a wire size adapter 124. Flat plate conductor 116 has first and second notches 144 and 142 for receiving small fuse fasteners 118 and 120, respectively, to secure flat plate conductor 116 between extended feet 140 and 138, respectively. Flat plate conductor 116 has a thickness and conductivity sufficient to carry a designed-for input current without failure. Because extended feet 140 and 138 are each of one piece with respective input coupling 108 and output coupling 112, expandable distribution block 100 acts as a direct electrical connection between input electrical conductor 128 and output electrical conductor 126. Wire size adapter 124 is inserted in opening 146 of input coupling 108, which opening 146 is sized for a larger gauge wire, to assist in providing a secure connection for a smaller gauge wire, such as input electrical conductor 128. Wire size adapter 124 has a flange 152 sized to snugly fit in opening 146. Flange 152 surrounds smaller gauge wire opening 148. A barrel 154, extending axially from the flange 152 of the wire size adapter 124, has an opening 160 for receiving the set screw 132 for direct contact with input electrical conductor 128. Wire size adapter 124 may also be used in output coupling 112, in particular embodiments.

Figure 2:
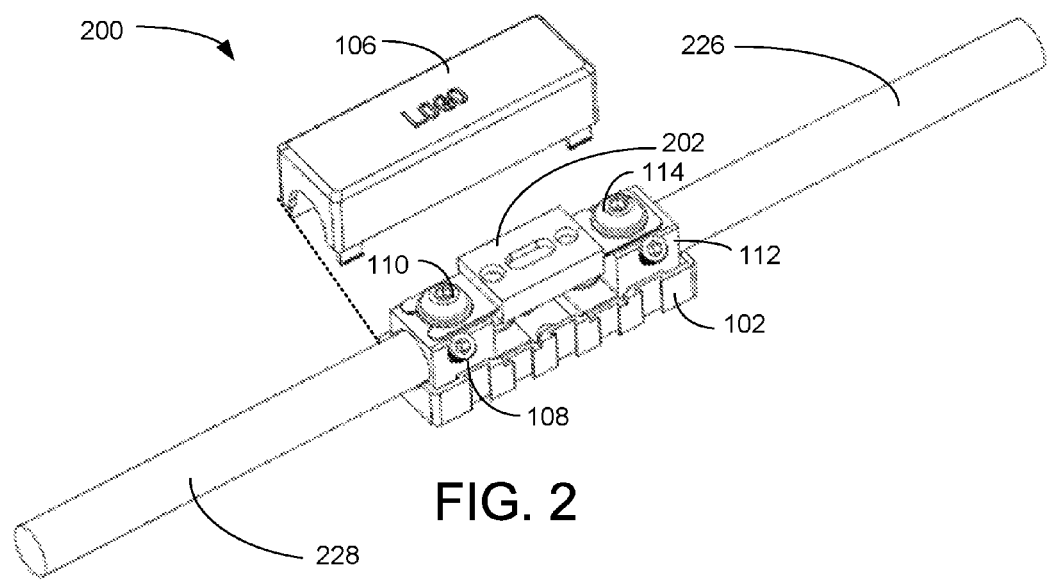
FIG. 2 is a top-front perspective view illustrating a second exemplary embodiment of an expandable distribution block, according to a preferred embodiment of the present invention.

FIG. 2 is a top-front perspective view illustrating a second exemplary embodiment of an expandable distribution block 200, according to a preferred embodiment of the present invention. Expandable distribution block 200 receives larger gauge input and output conductors 228 and 226, respectively. Large ANL fuse 202 is connected between input coupling 108 and output coupling 112 using large fuse fasteners 110 and 114, respectively.

Figure 3:
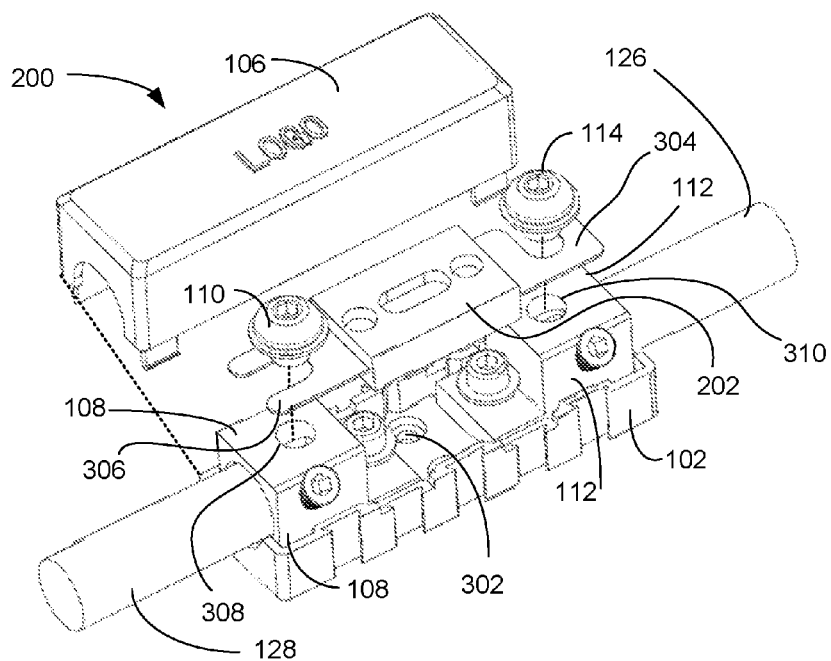
FIG. 3 is a top-front perspective exploded view illustrating the second exemplary embodiment of the expandable distribution block of FIG. 2, according to a preferred embodiment of the present invention.

FIG. 3 is a top-front perspective exploded view illustrating the second exemplary embodiment of the expandable distribution block 200 of FIG. 2, according to a preferred embodiment of the present invention. The characteristic couplings 306 and 304 of large ANL fuse 202 can be more clearly seen, as can the relationship between couplings 306 and 304, respective large fuse fasteners 110 and 114, and respective complimentary fastener elements 308 and 310, exemplified as threaded holes. Central countersunk fastener opening 302 may be used to fasten base 102 to an environmental surface.

Figure 4:
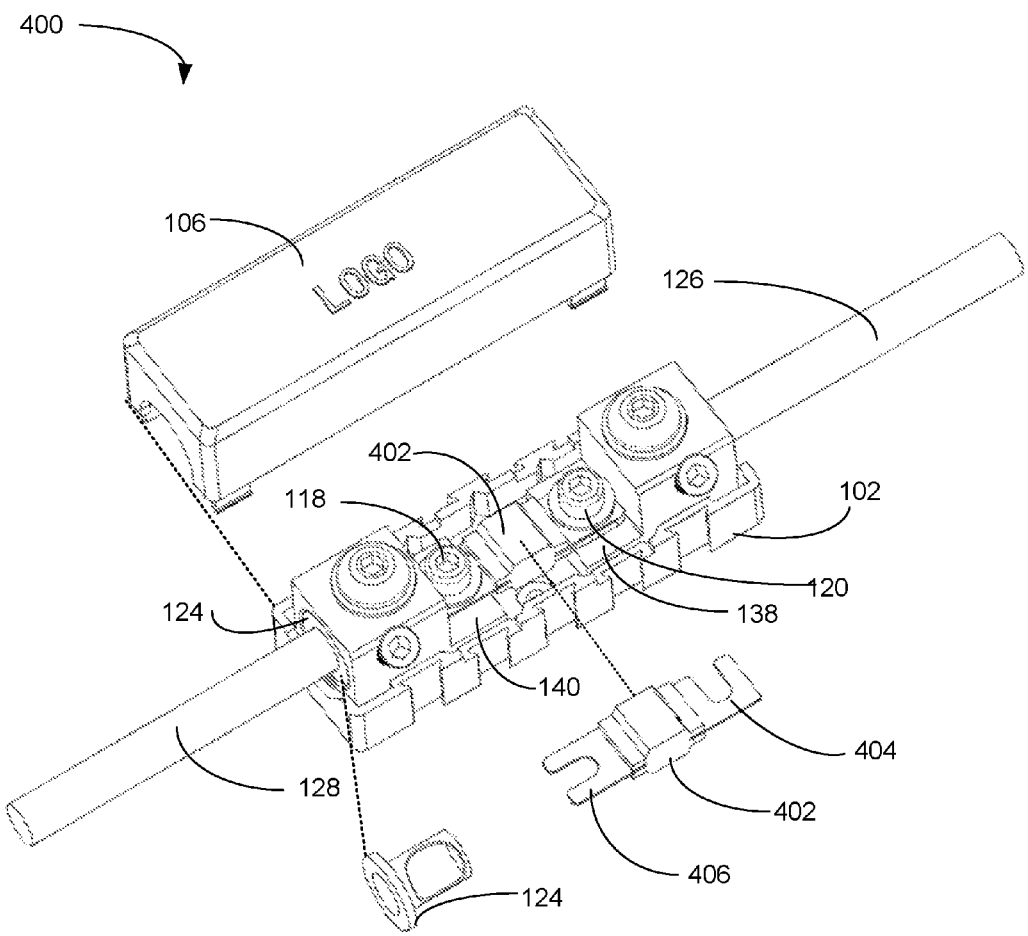
FIG. 4 is a top-front perspective exploded view illustrating a third exemplary embodiment of an expandable distribution block, according to a preferred embodiment of the present invention.

FIG. 4 is a top-front perspective exploded view illustrating a third exemplary embodiment of an expandable distribution block 400, according to a preferred embodiment of the present invention. Expandable distribution block 400 receives smaller gauge input and output conductors 128 and 126, respectively, using wire size adapters 124. Mini-ANL fuse 402 is connected between first and second extended feet 140 and 138 of input coupling 108 and output coupling 112, respectively, using small fuse fasteners 118 and 120, respectively. The characteristic couplings 406 and 404 of mini-ANL fuse 402 can be clearly seen.

Figure 5:
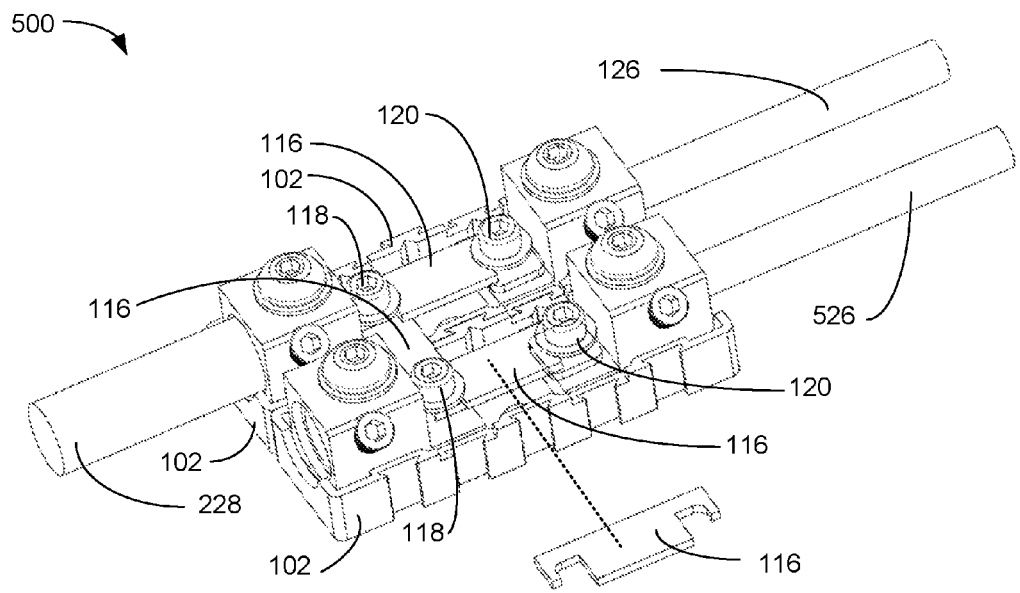
FIG. 5 is a top-front perspective view illustrating a fourth exemplary embodiment of an expandable distribution block, according to a preferred embodiment of the present invention.

FIG. 5 is a top-front perspective view illustrating a fourth exemplary embodiment of an expandable distribution block 500, according to a preferred embodiment of the present invention. Expandable distribution block 500 is a single-input, dual output distribution block 500 using two mechanically and electrically connected bases 102. The mechanical connection is via the dovetail joints 104, 122. Electrical connection between the two bases 102 is via a flat plate conductor 116 connected between respective small fuse fasteners 118. Two direct flat plate conductors 116 each connect between small fuse fasteners 118 and 120 on respective first and second bases 102. All flat plate conductors 116 may interchangeably be used as crossbar conductors or as direct conductors, as one part is innovatively used for both purposes. Expandable distribution block 500 has a larger gauge wire 228 as a single-input and smaller gauge wire for the dual outputs 126 and 526.

Figure 6:
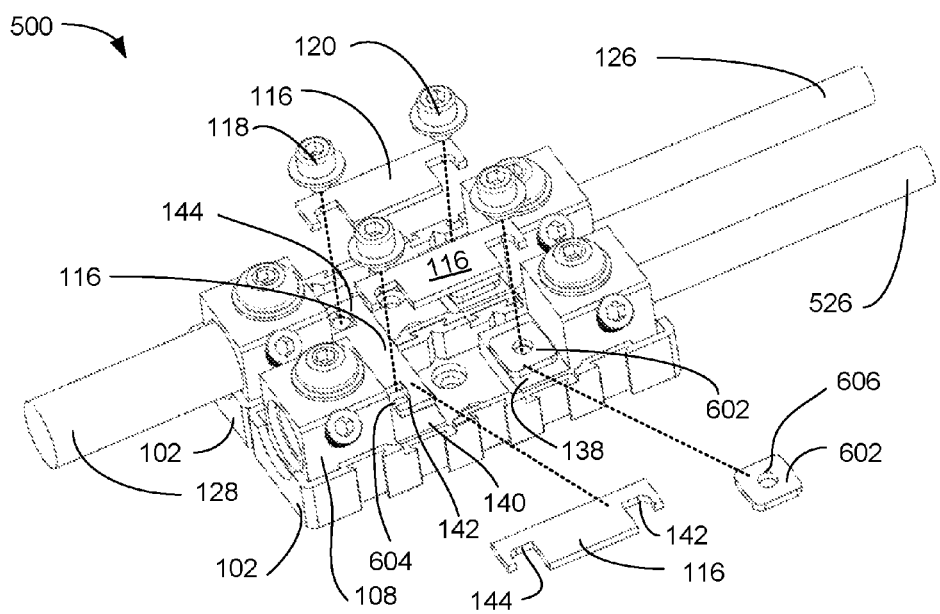
FIG. 6 is a top-front perspective exploded view illustrating the fourth exemplary embodiment of the expandable distribution block of FIG. 5, according to a preferred embodiment of the present invention.

FIG. 6 is a top-front perspective exploded view illustrating the fourth exemplary embodiment of the expandable distribution block 500 of FIG. 5, according to a preferred embodiment of the present invention. Complimentary fastener portions 604, exemplified as first and second threaded holes 604 (one of two labeled), which receive small fuse fasteners 118 (one of two labeled), are partially bounded by notches 144 and 142 of crossbar flat plate conductor 116 and fasten the crossbar flat plate conductor 116 between first and second extended feet 140 (one of two labeled). Direct connection flat plate conductors 116 are fastened on top of crossbar flat plate conductor 116 and spacers 602 (one of two labeled). Spacers 602 have the same thickness as flat plate conductors 116 and have through bores 606 through which small fuse fasteners 120 (one of two labeled).

Figure 7:
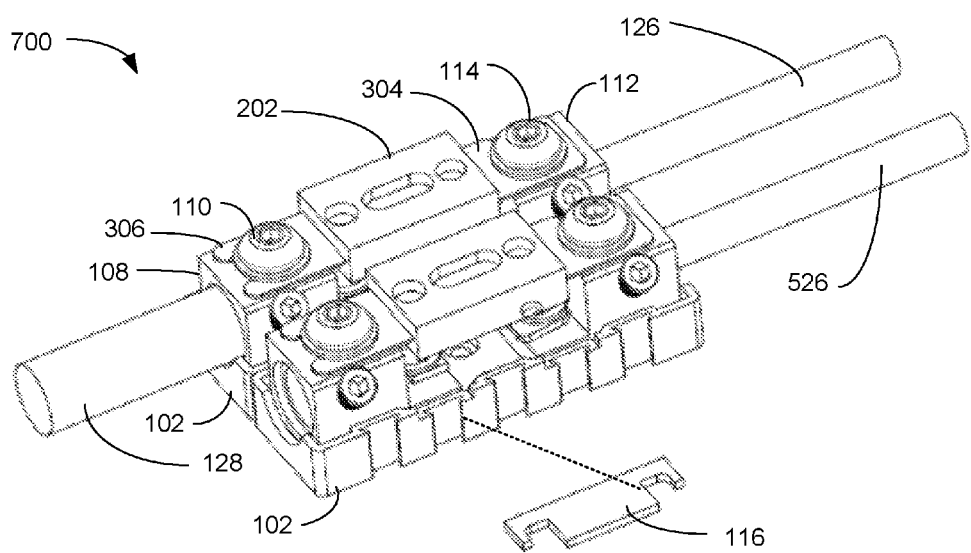
FIG. 7 is a top-front perspective view illustrating a fifth exemplary embodiment of an expandable distribution block, according to a preferred embodiment of the present invention.

FIG. 7 is a top-front perspective view illustrating a fifth exemplary embodiment of an expandable distribution block 700, according to a preferred embodiment of the present invention. Expandable distribution block 700 is similar to expandable distribution block 500, but features large ANL fuses 202 (one of two labeled) instead of direct flat plate conductors 116. Crossbar flat plate conductor 116 is still installed. Large fuse fasteners 110 and 114 (one of two labeled) fasten respective larger ANL fuse couplings 306 and 304 (one of two labeled) to respective input and output couplings 108 and 112 (one of two of each labeled). Expandable distribution block 700 has a larger gauge wire 228 as a single-input and smaller gauge wire for the dual outputs 126 and 526.

Figure 8:
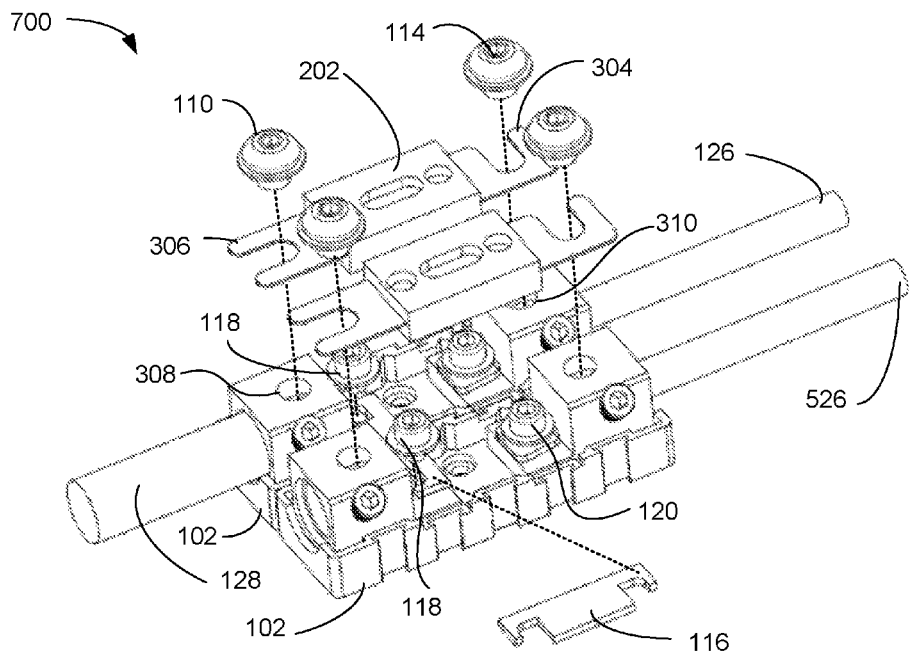
FIG. 8 is a top-front perspective exploded view illustrating the fifth exemplary embodiment of the expandable distribution block of FIG. 7, according to a preferred embodiment of the present invention.

FIG. 8 is a top-front perspective exploded view illustrating the fifth exemplary embodiment of the expandable distribution block 700 of FIG. 7, according to a preferred embodiment of the present invention. Small fuse fasteners 118 fasten crossbar flat plate conductor 116, as in expandable distribution block 500. Small fuse fasteners 120 (one of two labeled) are not used in this embodiment, but may be retained in case reconfiguration is desired. Complimentary fastener elements 308 and 310 (one of two labeled), exemplified as threaded holes, can be more clearly seen, as well as the relationship between large fuse fasteners 110 and 114 (one of two of each labeled), respective characteristic couplings 306 and 304 (one of two labeled), and large ANL fuses 202 (one of two labeled). While Alan head screws are preferred as large fuse fasteners 110 and 114 and as small fuse fasteners 118 and 102, other fasteners may be used in various embodiments.

Figure 9:
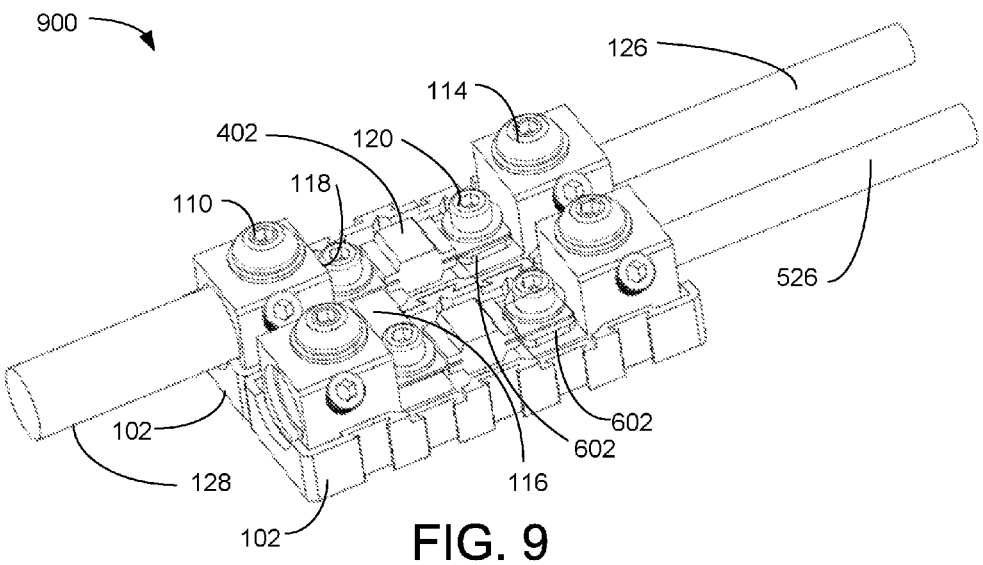
FIG. 9 is a top-front perspective view illustrating a sixth exemplary embodiment of an expandable distribution block, according to a preferred embodiment of the present invention.

FIG. 9 is a top-front perspective view illustrating a sixth exemplary embodiment of an expandable distribution block 900, according to a preferred embodiment of the present invention. Expandable distribution block 900 is similar to expandable distribution block 500 and expandable distribution block 700, but uses small ANL fuses 402 instead of direct flat plate conductors 116 or large ANL fuses 202. Small fuse fasteners 118 and 120 (one of two of each labeled) secure mini-ANL fuses 402 (one of two labeled) in place. Large fuse fasteners 110 and 114 (one of two of each labeled) are not used in this embodiment, but are retained in case reconfiguration is desired.

Figure 10:
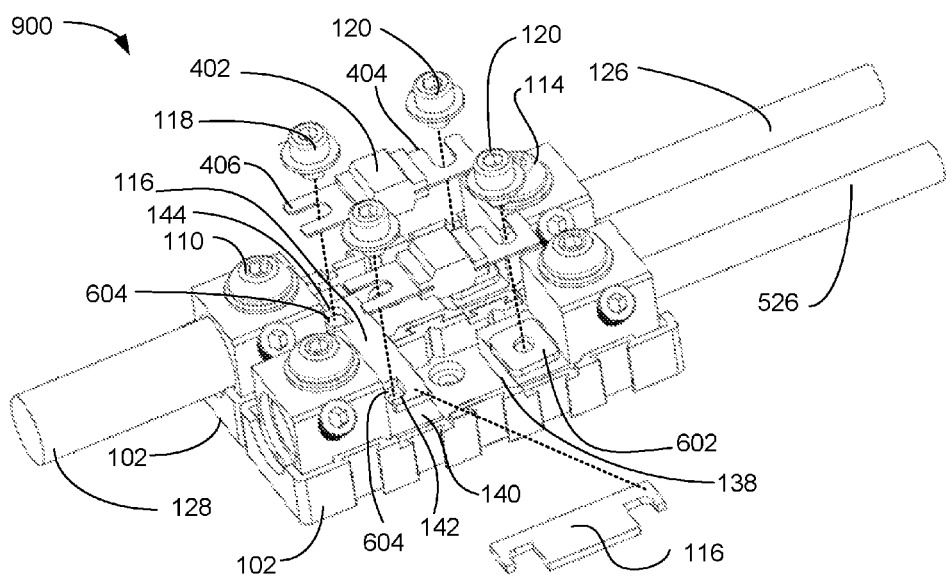
FIG. 10 is a top-front perspective exploded view illustrating the sixth exemplary embodiment of the expandable distribution block of FIG. 9, according to a preferred embodiment of the present invention.

FIG. 10 is a top-front perspective exploded view illustrating the sixth exemplary embodiment of the expandable distribution block 900 of FIG. 9, according to a preferred embodiment of the present invention. The orientation of crossbar flat plate conductor 116 can be clearly seen, with complimentary fastener portions 604 (one of two labeled), exemplified as threaded holes 604, visible in notches 144 and 142 of crossbar flat plate conductor 116. The relationship of small fuse fasteners 118 (one of two labeled) to characteristic couplings 406 (one of two labeled), of mini-ANL fuses 402 (one of two labeled), crossbar flat plate conductor 116, complimentary fastener portions 604 (one of two labeled), and extended feet 140 (one of two labeled) can be seen. The relationship of small fuse fasteners 120 to characteristic couplings 404 (one of two labeled) of mini-ANL fuses 402 (one of two labeled), spacers 602 (one of two labeled), and extended feet 138 (one of two labeled). While Alan head screws are preferred as small fuse fasteners 118 and 120, other fasteners may be used in various embodiments.

Figure 11:
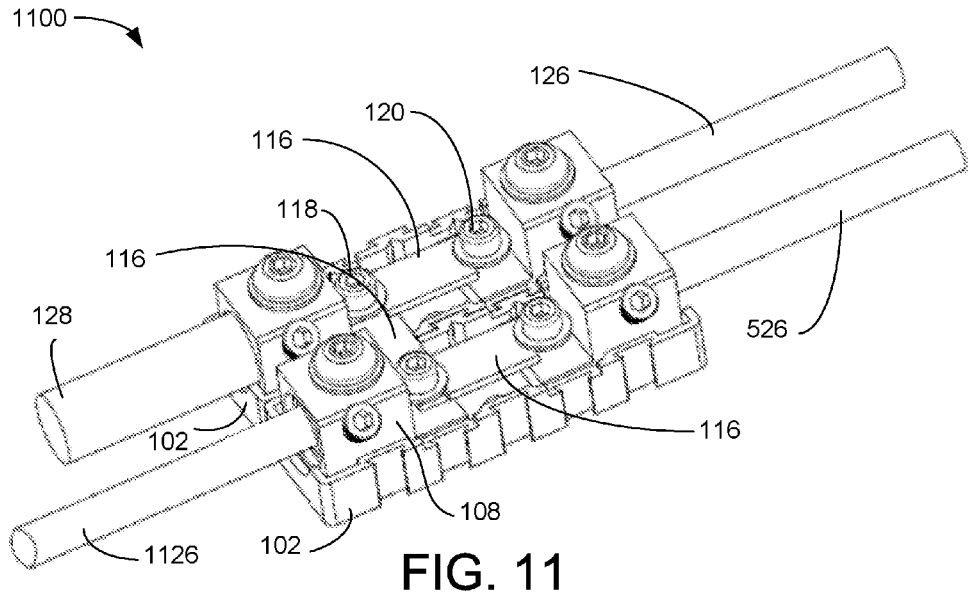
FIG. 11 is a top-front perspective view illustrating a seventh exemplary embodiment of an expandable distribution block, according to a preferred embodiment of the present invention.

FIG. 11 is a top-front perspective view illustrating a seventh exemplary embodiment of an expandable distribution block 1100, according to a preferred embodiment of the present invention. Expandable distribution block 1100 is identical to expandable distribution block 500 with and additional output wire 1126 coupled to input coupling 108 (one of two labeled). Accordingly, expandable distribution block 1100 is a single-input, three-output, directly connected distribution block 1100.

Figure 12:
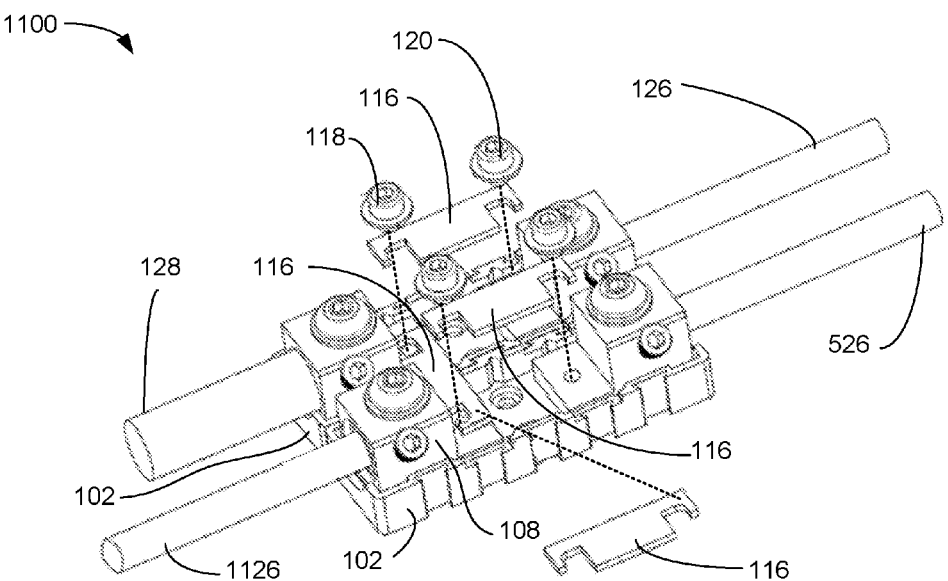
FIG. 12 is a top-front perspective exploded view illustrating the seventh exemplary embodiment of the expandable distribution block of FIG. 11, according to a preferred embodiment of the present invention.

FIG. 12 is a top-front perspective exploded view illustrating the seventh exemplary embodiment of the expandable distribution block 1100 of FIG. 11, according to a preferred embodiment of the present invention. Expandable distribution block 1100 is identical to expandable distribution block 500 with and additional output wire 1126 coupled to input coupling 108.

Figure 13:
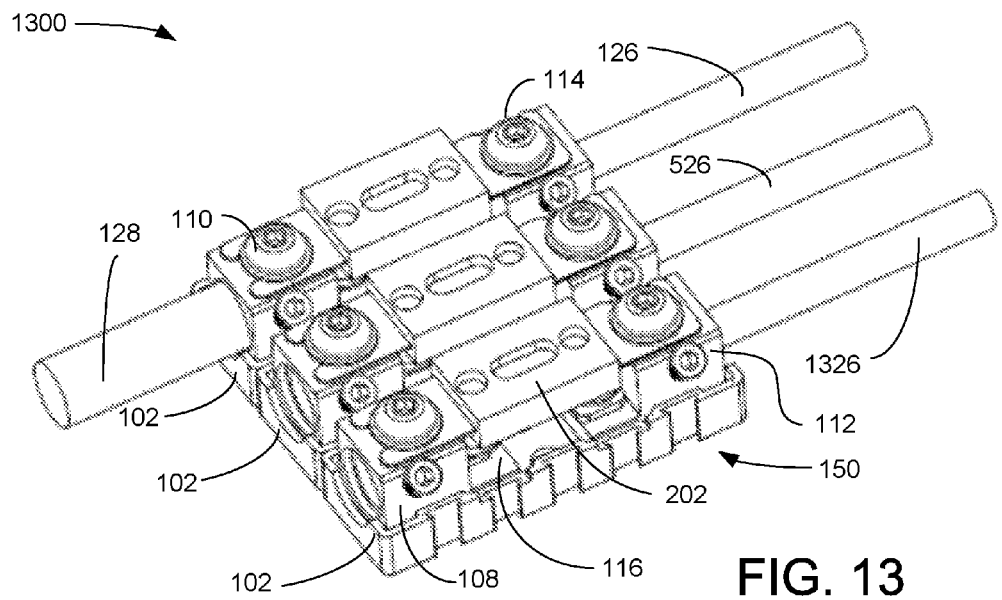
FIG. 13 is a top-front perspective view illustrating an eighth exemplary embodiment of an expandable distribution block, according to a preferred embodiment of the present invention.

FIG. 13 is a top-front perspective view illustrating an eighth exemplary embodiment of an expandable distribution block 1300, according to a preferred embodiment of the present invention. Expandable distribution block 1300 is identical to expandable distribution block 700 with and additional element 150 (snap-fit cap 106 not shown) mechanically and electrically connected to expand the distribution block 1300. Additional element 150 has output wire 1326 coupled to output coupling 112 (one of three labeled). Additional element 150 supports and couples a large ANL fuse 202 (one of three labeled) between input coupling 108 and output coupling 112. Accordingly, expandable distribution block 1300 is a single-input, three-output, fused distribution block 1300. The uniformity of fusing 202 shown is merely exemplary: fuses 202 and 402 and direct flat plate conductors may be used in different elements 150 in the same distribution block in any of the illustrated, described, inherent, or implied embodiments in the present disclosure.

Figure 14:
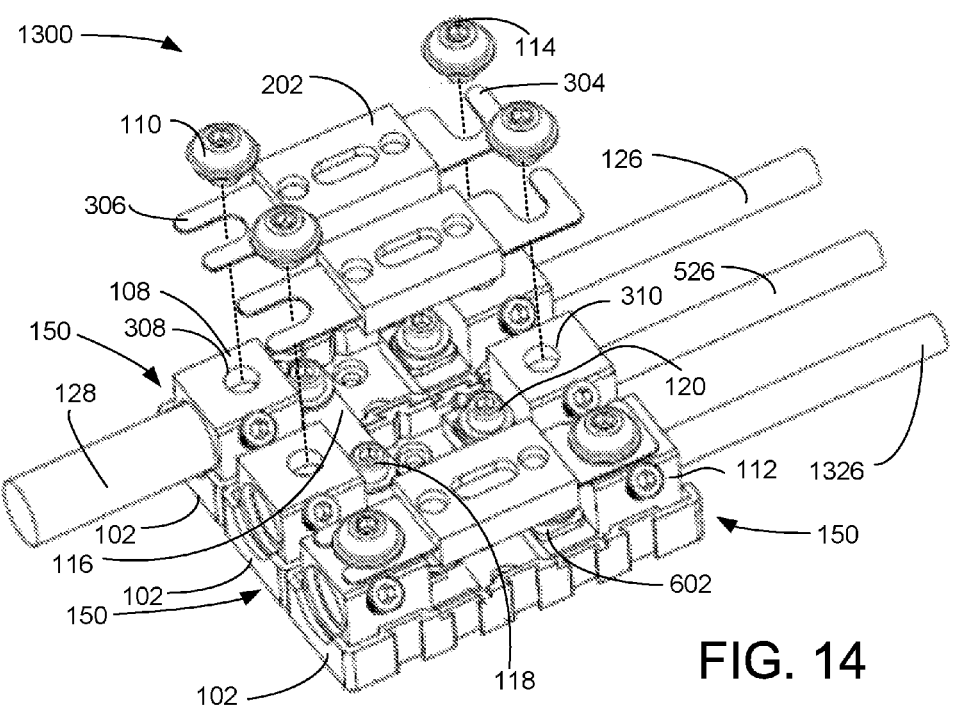
FIG. 14 is a top-front perspective exploded view illustrating the eighth exemplary embodiment of the expandable distribution block of FIG. 13, according to a preferred embodiment of the present invention.

FIG. 14 is a top-front perspective exploded view illustrating the eighth exemplary embodiment of the expandable distribution block 1300 of FIG. 13, according to a preferred embodiment of the present invention. Two crossbar flat plate conductors 116 are used; one to connect the input element 150 to the middle element 150 and a second to connect the middle element 150 to the far end (from the input) element 150. For a best look at how multiple crossbar flat plate conductors 116 are used to connect multiple elements 150, see FIG. 19. Crossbar flat plate conductors 116 are secured with small fuse fasteners 118 (one of three labeled). Small fuse fasteners 120 (one of three labeled) and spacers 602 (one of three labeled) are not used in this embodiment, but may be retained in case reconfiguration is desired. The relationship between large fuse fasteners 110 (one of three labeled), characteristic couplings 306 (one of three labeled) of large ANL fuse 202 (one of three labeled), and complimentary fastener elements 308 (one of three labeled) of input couplings 108 (one of three labeled) can be seen. The relationship between large fuse fasteners 114 (one of three labeled), characteristic couplings 304 (one of three labeled) of large ANL fuse 202 (one of three labeled), and complimentary fastener elements 310 (one of three labeled) of output couplings 112 (one of three labeled) can be clearly seen. Snap fit caps 106 fit on each base 102 in all embodiments, but are not shown in all drawings to simplify the illustrations.

Figure 15:
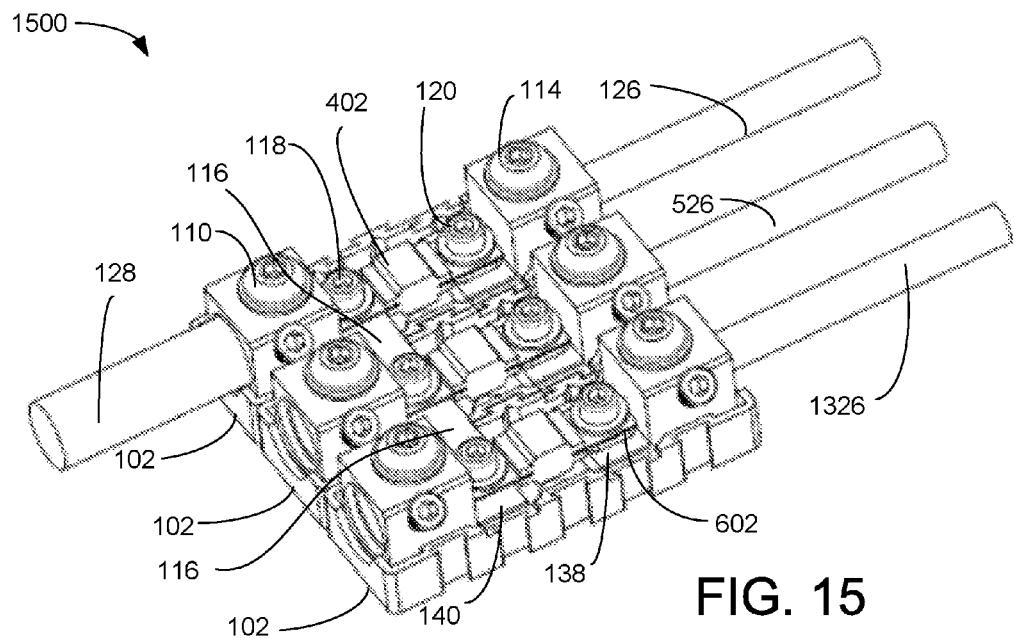
FIG. 15 is a top-front perspective view illustrating a ninth exemplary embodiment of an expandable distribution block, according to a preferred embodiment of the present invention.

FIG. 15 is a top-front perspective view illustrating a ninth exemplary embodiment of an expandable distribution block 1500, according to a preferred embodiment of the present invention. Expandable distribution block 1500 is similar to expandable distribution block 1300 except mini-ANL fuses 402 are mounted instead of large ANL fuses 202. Large fuse fasteners 110 (one of three labeled) and 114 (one of three labeled) are not used in this embodiment, but may be retained in case a configuration change is desired. Fuses 402 are fastened on top of crossbar flat plate conductors 116 using small fuse fasteners 118 (one of three labeled) and on top of spacers 602 (one of three labeled) using small fuse fasteners 120 (one of three labeled). Those of skill in the art, enlightened by the present disclosure, will appreciate that any number of elements 150 may be mechanically connected and electrically connected, within the electrical current-carrying capacity of the particular embodiment.

Figure 16:
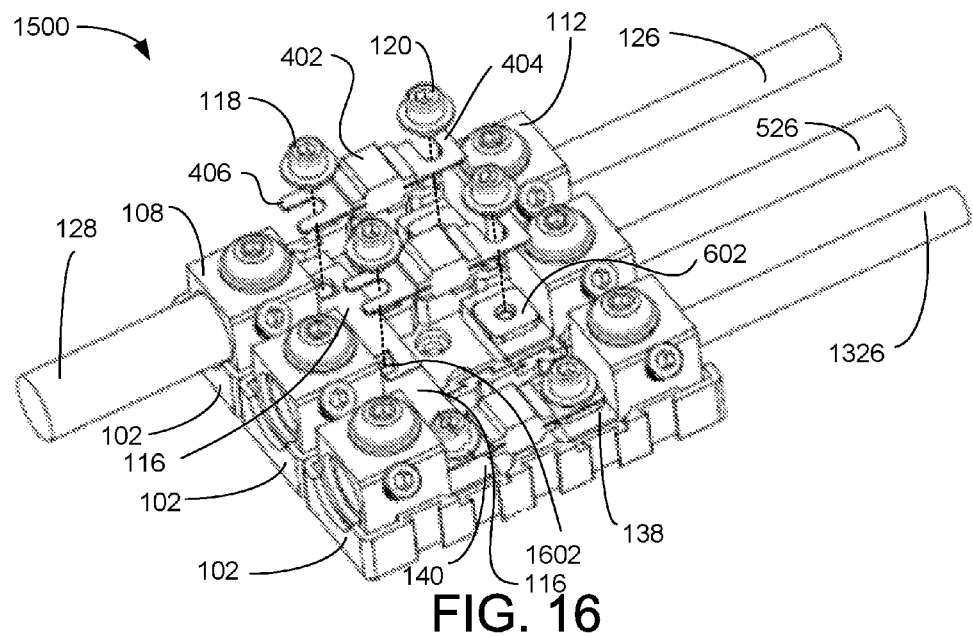
FIG. 16 is a top-front perspective exploded view illustrating the ninth exemplary embodiment of the expandable distribution block of FIG. 15, according to a preferred embodiment of the present invention.

FIG. 16 is a top-front perspective exploded view illustrating the ninth exemplary embodiment of the expandable distribution block 1500 of FIG. 15, according to a preferred embodiment of the present invention. Small fuse fasteners 118 fasten characteristic couplings 406 (one of three labeled) of mini-ANL fuses 402 (one of three labeled) to crossbar flat plate conductors 116 and to extended feet 140 (one of three labeled) of input couplings 108 (one of three labeled). Small fuse fasteners 120 fasten characteristic couplings 404 (one of three labeled) of mini-ANL fuses 402 (one of three labeled) to spacers 602 (one of three labeled) and to extended feet 138 (one of three labeled) of output couplings 112 (one of three labeled). Opening 1602, formed by the juxtaposition of notches 144 and/or 142 from two crossbar flat plate conductors 116, is aligned to complimentary fastener portion 604 in extended foot 140 in the middle input coupling 108 (one of three labeled). Expandable distribution block 1500 is exemplary of electrically and mechanically connected elements 150 in a single-input, multiple-output, fused distribution block. Additional elements 150 can be added in a similar way, as will be discussed below.

Figure 17:
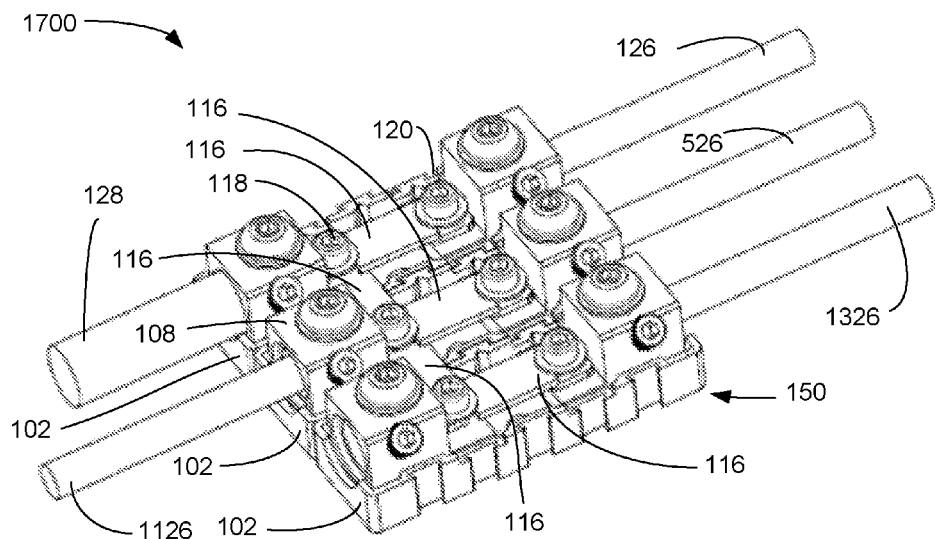
FIG. 17 is a top-front perspective view illustrating a tenth exemplary embodiment of an expandable distribution block, according to a preferred embodiment of the present invention.

FIG. 17 is a top-front perspective view illustrating a tenth exemplary embodiment of an expandable distribution block 1700, according to a preferred embodiment of the present invention. Expandable distribution block 1700 is a single-input, four-output, directly connected expandable distribution block 1700. It differs from expandable distribution block 1300 by the addition of an additional output wire to middle input coupling 108, and the use of direct flat plate conductors 116 instead of large ANL fuses 202. In a variation of this embodiment, one or more of output wires 126, 526, and 1326 could be connected to the input wire 128 using fuses 202 or 402 while output wire 1126 remains directly connected to the input wire 128.

Figure 18:
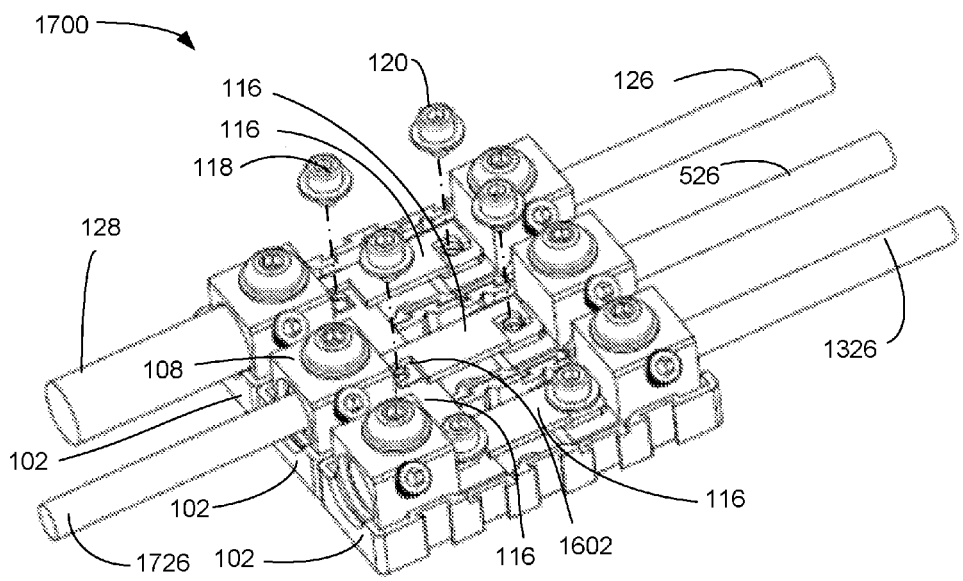
FIG. 18 is a top-front perspective exploded view illustrating the tenth exemplary embodiment of the expandable distribution block of FIG. 17, according to a preferred embodiment of the present invention.

FIG. 18 is a top-front perspective exploded view illustrating the tenth exemplary embodiment of the expandable distribution block 1700 of FIG. 17, according to a preferred embodiment of the present invention. The exploded view illustrates assembly of the expandable distribution block 1700, using arrangements described in regard to previous embodiments.

Figure 19:
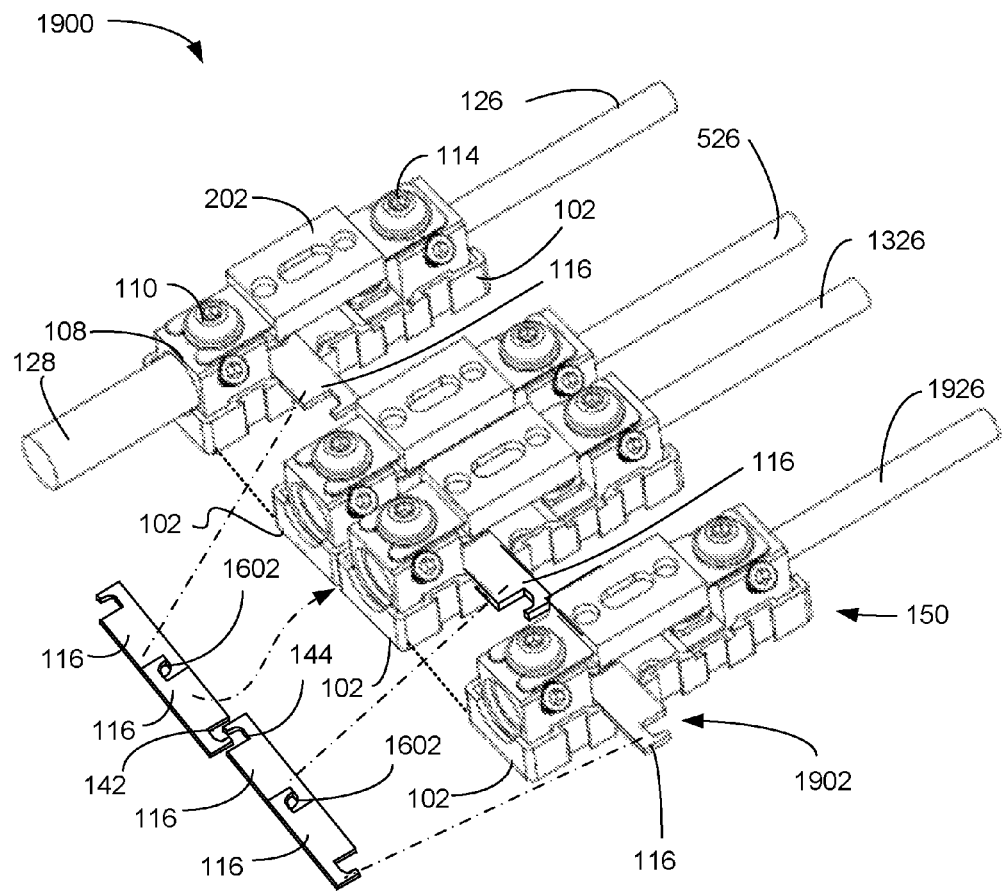
FIG. 19 is a top-front perspective exploded view illustrating an eleventh exemplary embodiment of the expandable distribution block, according to a preferred embodiment of the present invention.

FIG. 19 is a top-front perspective exploded view illustrating an eleventh exemplary embodiment of the expandable distribution block 1900, according to a preferred embodiment of the present invention. Expandable distribution block 1900 is a single-input 128, four-output 126, 526, 1326, 1926, fuse-connected 202 expandable distribution block 1900 with large ANL fuses 202 (one of four labeled). Expandable distribution block 1900 is the same as expandable distribution block 1300 except for the addition of an element 150, a fourth output wire 1926, and an additional 1902 crossbar 116 that may be used to connect yet another element 150. The illustration of four crossbar flat plate conductors 116 shows how notches 142 (one of four labeled) and 144 (one of four labeled) interact to form openings 1602 which will align with complimentary fastener portions 604 (not visible in this view) in extended feet 140 (not visible in this view) of input couplings 108 (one of four labeled).

Figure 20:
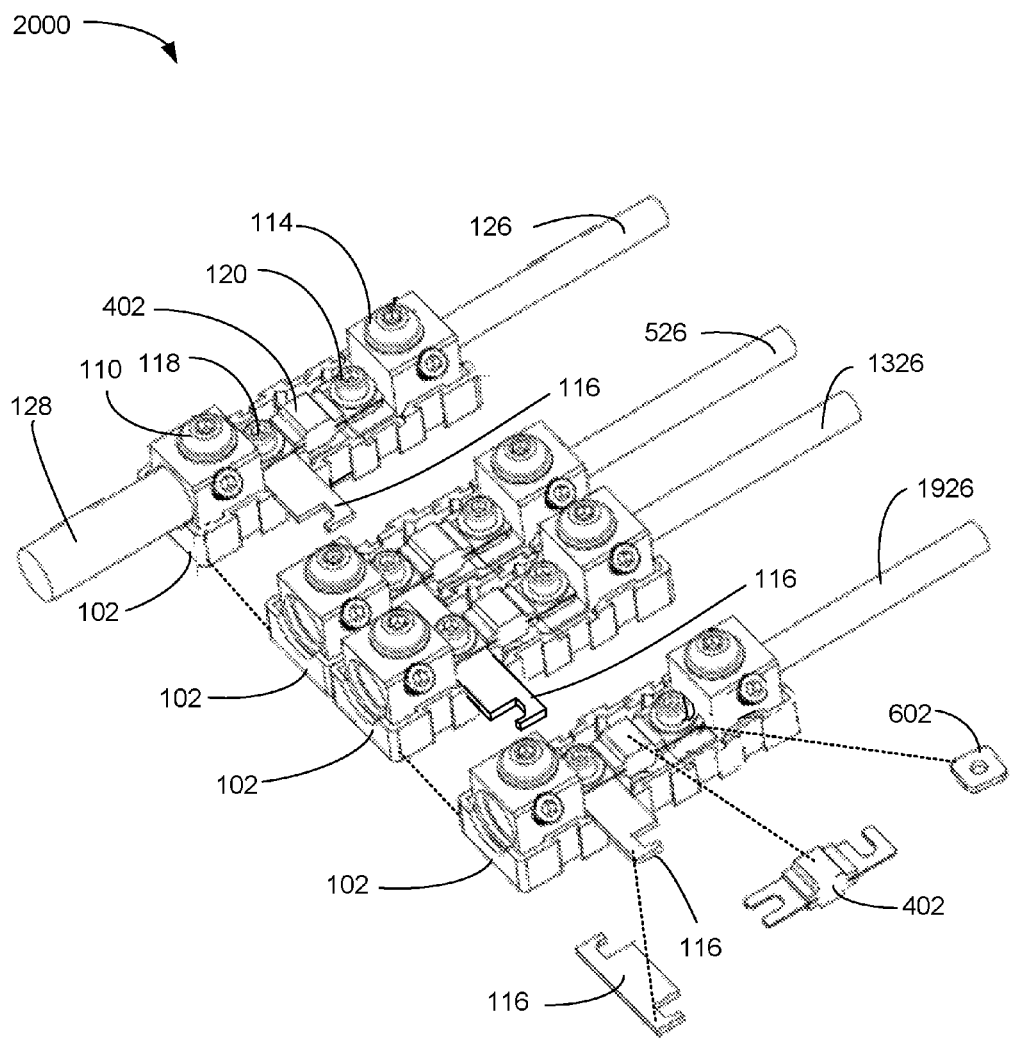
FIG. 20 is a top-front perspective exploded view illustrating a twelfth exemplary embodiment of the expandable distribution block, according to a preferred embodiment of the present invention.

FIG. 20 is a top-front perspective exploded view illustrating a twelfth exemplary embodiment of the expandable distribution block 2000, according to a preferred embodiment of the present invention. Expandable distribution block 2000 is similar to expandable distribution block 1900, but uses mini-ANL fuses 402 (one of four installed labeled) instead of large ANL fuses 202. The exploded view illustrates assembly of the expandable distribution block 1700, using arrangements described in regard to previous embodiments.

Figure 21:
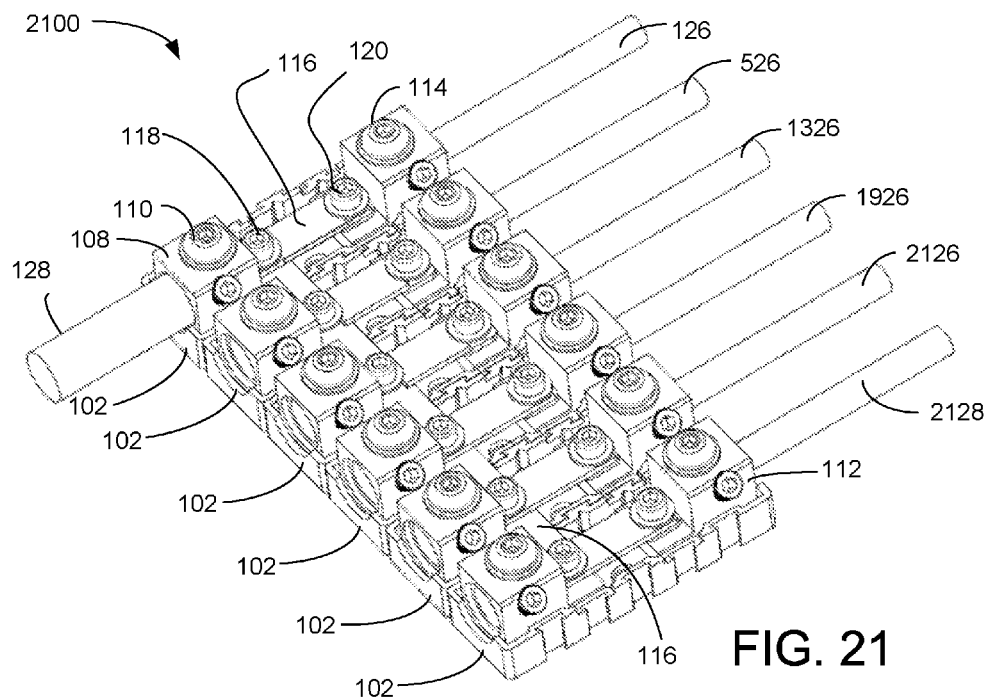
FIG. 21 is a top-front perspective view illustrating a thirteenth exemplary embodiment of the expandable distribution block, according to a preferred embodiment of the present invention.

FIG. 21 is a top-front perspective view illustrating a thirteenth exemplary embodiment of the expandable distribution block 2100, according to a preferred embodiment of the present invention. expandable distribution block 2100 is a single-input 128, six-output 126, 526, 13326, 1926, 2126 and 2128, directly connected expandable distribution block 2000. All six bases 102 are mechanically connected by dovetail joints 104, 122, and all six input couplings 108 (one of six labeled) are electrically connected by crossbar flat plate conductors 116 (one of five labeled). Each input coupling 108 (one of six labeled) is connected to one corresponding output coupling 112 (one of six labeled) by a direct flat plate conductor 116 (one of six labeled) secured by small fuse fasteners 118 (one of six labeled) and 120 (one of six labeled).

Figure 22:
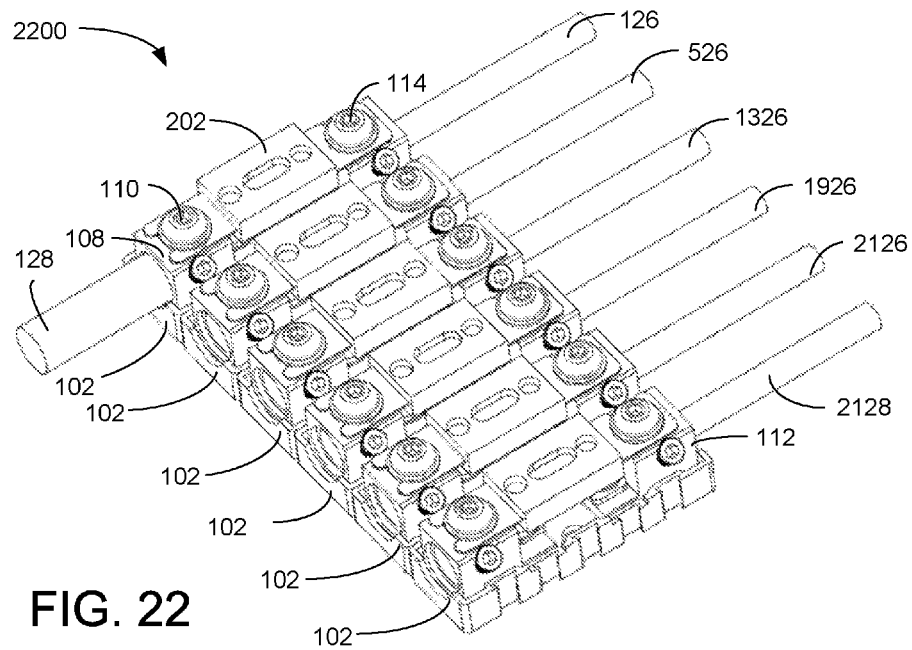
FIG. 22 is a top-front perspective view illustrating a fourteenth exemplary embodiment of the expandable distribution block, according to a preferred embodiment of the present invention.

FIG. 22 is a top-front perspective view illustrating a fourteenth exemplary embodiment of the expandable distribution block 2200, according to a preferred embodiment of the present invention. Expandable distribution block 2200 is similar to expandable distribution block 2100 except for the use of large ANL fuses 202 (one of six labeled) instead of direct flat plate conductors 116 (see FIG. 21).

Figure 23:
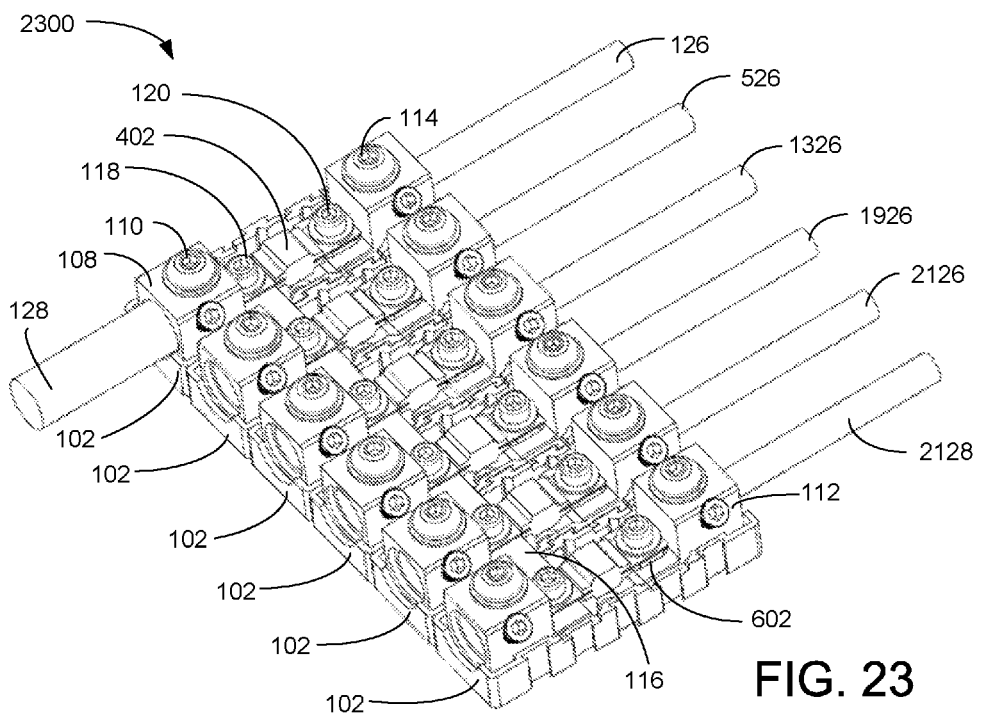
FIG. 23 is a top-front perspective view illustrating a fifteenth exemplary embodiment of the expandable distribution block, according to a preferred embodiment of the present invention.

FIG. 23 is a top-front perspective view illustrating a fifteenth exemplary embodiment of the expandable distribution block 2300, according to a preferred embodiment of the present invention. Expandable distribution block 2300 is similar to expandable distribution block 2200 except for the use of mini-ANL fuses 402 (one of six labeled) instead of direct flat plate conductors large ANL fuses 202 (see FIG. 22).

Figure 24:
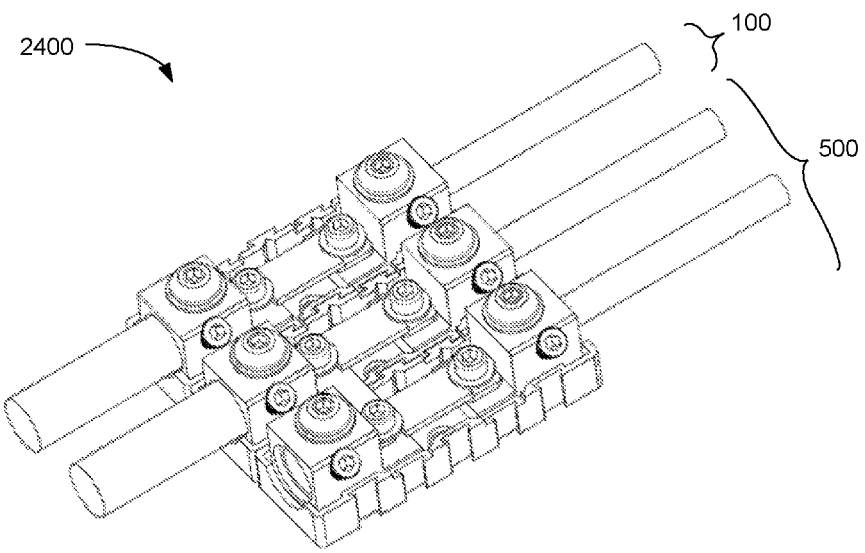
FIG. 24 is a top-front perspective view illustrating a sixteenth exemplary embodiment of the expandable distribution block, according to a preferred embodiment of the present invention.

FIG. 24 is a top-front perspective view illustrating a sixteenth exemplary embodiment of the expandable distribution block 24, according to a preferred embodiment of the present invention. Expandable distribution block 2400 is a hybrid including expandable distribution block 100 mechanically, but not electrically, connected to expandable distribution block 500. Expandable distribution block 2400 illustrates that a plurality of separate expandable distribution blocks 100 and 500 may be accommodated in one expandable distribution block 2400. Such plurality is not limited to two. In a particular hybrid embodiment, separate expandable distribution blocks 100 and 500 may use different fusing, or none at all.

Figure 25:
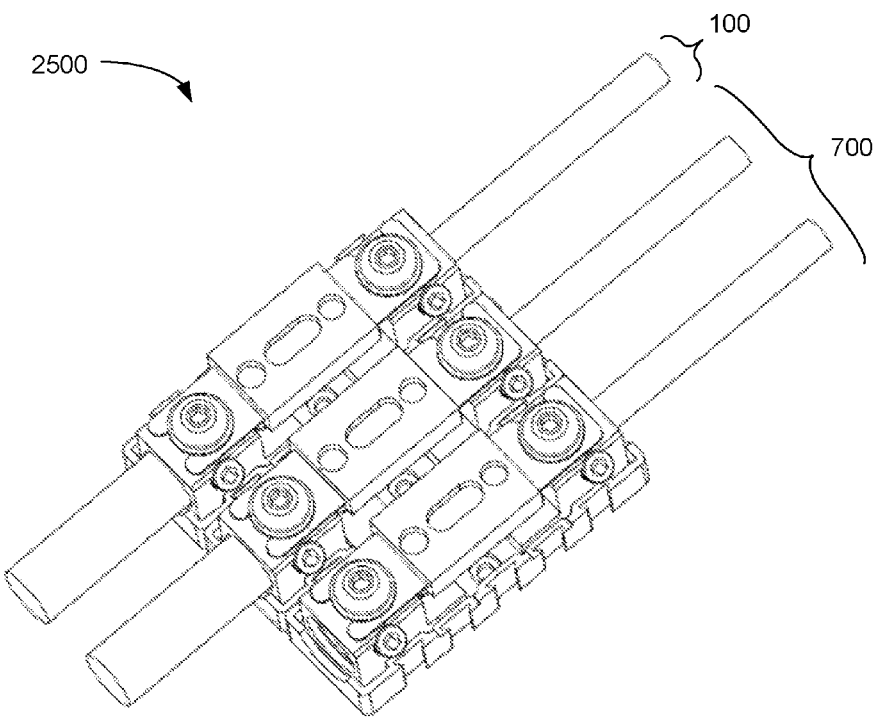
FIG. 25 is a top-front perspective view illustrating a seventeenth exemplary embodiment of the expandable distribution block, according to a preferred embodiment of the present invention.

FIG. 25 is a top-front perspective view illustrating a seventeenth exemplary embodiment of the expandable distribution block 2500, according to a preferred embodiment of the present invention. Expandable distribution block 2500 is a hybrid including expandable distribution block 100 mechanically, but not electrically, connected to expandable distribution block 700. Expandable distribution block 2500 illustrates that a plurality of separate expandable distribution blocks 100 and 700 may be accommodated in one expandable distribution block 2400. Such plurality is not limited to two. In a particular hybrid embodiment, separate expandable distribution blocks 100 and 700 may use different fusing, or none at all.

Figure 26:
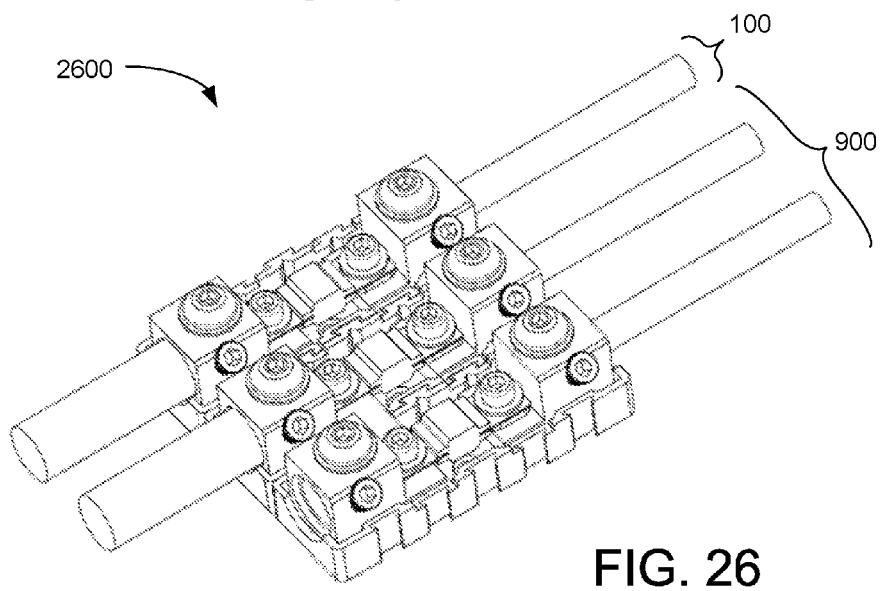
FIG. 26 is a top-front perspective view illustrating a eighteenth exemplary embodiment of the expandable distribution block, according to a preferred embodiment of the present invention.

FIG. 26 is a top-front perspective view illustrating a eighteenth exemplary embodiment of the expandable distribution block 2600, according to a preferred embodiment of the present invention. Expandable distribution block 2600 is a hybrid including expandable distribution block 100 mechanically, but not electrically, connected to expandable distribution block 900. Expandable distribution block 2600 illustrates that a plurality of separate expandable distribution blocks 100 and 900 may be accommodated in one expandable distribution block 2600. In a particular hybrid embodiment, separate expandable distribution blocks 100 and 900 may use different fusing, or none at all.

Figure 27:
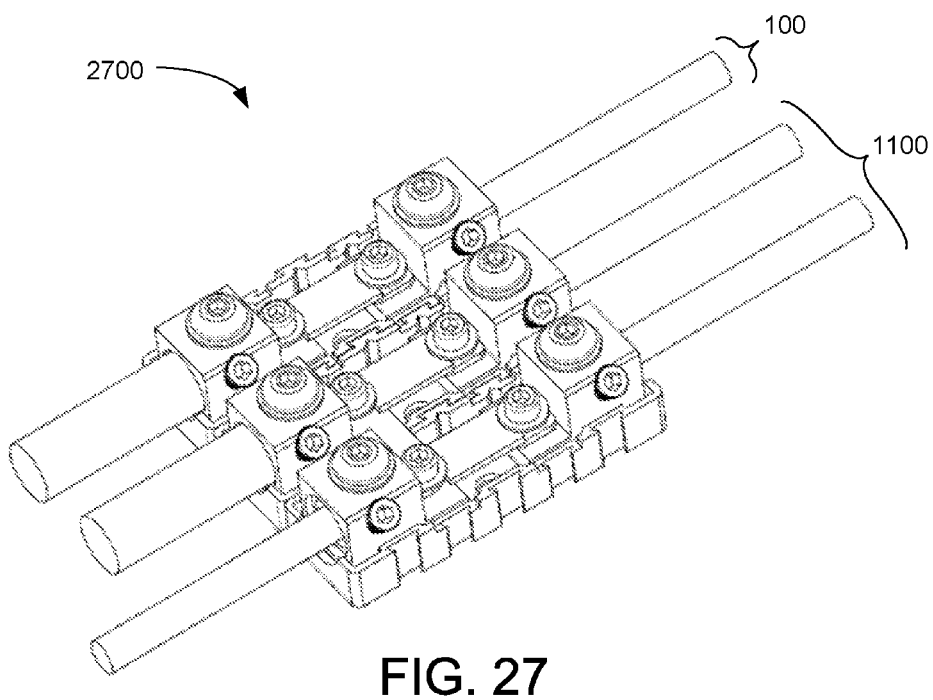
FIG. 27 is a top-front perspective view illustrating a nineteenth exemplary embodiment of the expandable distribution block, according to a preferred embodiment of the present invention.

FIG. 27 is a top-front perspective view illustrating a nineteenth exemplary embodiment of the expandable distribution block 2700, according to a preferred embodiment of the present invention. Expandable distribution block 2700 is a hybrid including expandable distribution block 100 mechanically, but not electrically, connected to expandable distribution block 1100. Expandable distribution block 2700 illustrates that a plurality of separate expandable distribution blocks 100 and 1100 may be accommodated in one expandable distribution block 2700. Expandable distribution block 2700 illustrates that a plurality of separate expandable distribution blocks 100 and 1100 may be accommodated in one expandable distribution block 2700. In a particular hybrid embodiment, separate expandable distribution blocks 100 and 1100 may use different fusing, or none at all.

Figure 28:
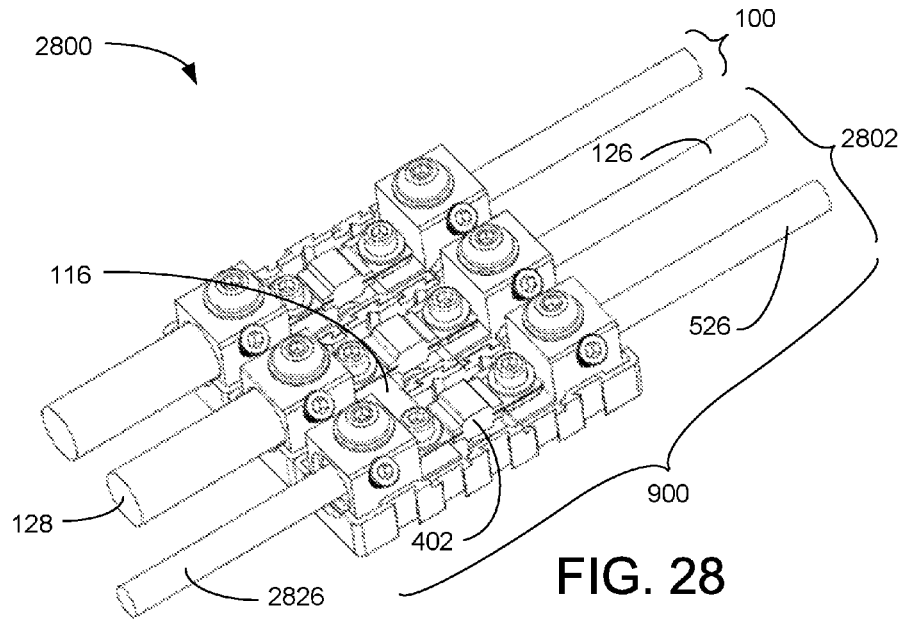
FIG. 28 is a top-front perspective view illustrating a twentieth exemplary embodiment of the expandable distribution block, according to a preferred embodiment of the present invention.

FIG. 28 is a top-front perspective view illustrating a twentieth exemplary embodiment of the expandable distribution block 2800, according to a preferred embodiment of the present invention. Expandable distribution block 2800 includes expandable distribution block 100 mechanically, but not electrically, connected to expandable distribution block 2802, which is similar to expandable distribution block 900, but adds an additional directly-connected output wire 2826. Expandable distribution block 2800 illustrates that fused outputs 126 and 526 may be used on an expandable distribution block 2802 that also has a direct (not fused) output 2826. The combination of fused and un-fused outputs may be applied to any expandable distribution block having two or more elements 150.

FIG. 29 is a top plan view illustrating an exemplary embodiment of the exemplary mechanical connectors 104, 122 of the expandable distribution blocks 500 of FIG. 5, according to a preferred embodiment of the present invention. FIG. 29 illustrates the mechanical connectors 104 (four of nine labeled), 122 (four of nine labeled) as being of one piece with the base 102. Mechanical connectors 104 (four of nine labeled), 122 (four of nine labeled) are exemplified as dovetail joints 104 (four of nine labeled), 122 (four of nine labeled), but the invention is not so limited.

FIG. 30 is a top plan view illustrating an exemplary embodiment of the exemplary mechanical connectors of the expandable distribution blocks 500 of FIG. 5, according to a preferred embodiment of the present invention. FIG. 30 superimposes the bottom surface of snap fit caps 106 on bases 102.

FIG. 31 is a top plan view illustrating an exemplary embodiment of the exemplary mechanical connection of the expandable distribution blocks 500 of FIG. 5, according to a preferred embodiment of the present invention. FIG. 31 shows two bases 102, with snap fit caps 106 installed, mechanically connected using integral mechanical connectors 104, 122.

FIG. 32 is a top-front perspective view illustrating an exemplary embodiment of the base and cap of the exemplary expandable distribution block of FIG. 1, according to a preferred embodiment of the present invention. FIG. 32 shows snap fit cap 106 installed on base 102. Notches 3202 (one of four labeled) accommodate crossbar flat plate conductors 116.

FIG. 33 is a top-front perspective view illustrating an exemplary embodiment of the bases 102 and caps 106 of exemplary expandable distribution blocks 100, according to a preferred embodiment of the present invention. FIG. 33 suggests the indefinitely large extent of the number of elements 150 (as represented by bases 120 and snap fit caps 106) that may make up an expandable distribution block of the present invention.

We claim:

1. An expandable distribution block for distributing electrical power though direct connections and/or fused connections, the expandable distribution block comprising:
   a. a generally rectangular electrically non-conductive base having first and second opposed long sides;
   b. at least one first portion of a mechanical connector formed in, and of one piece with, said first long side of said base;
   c. at least one second portion of said mechanical connector formed in, and of one piece with, said second long side of said base;
   d. wherein said first and second portions of said mechanical connector are complimentary and mutually engageable between first and second adjacent said bases
   e. a first two-level electrical input coupling and similar second two-level electrical output coupling mounted in opposed ends of said base, thereby forming an element of said expandable distribution block;
   f. wherein:
      i. each said input coupling and output coupling comprises a block having an upper top surface;
      ii. an extended foot that is of one piece with said block and having a lower too surface, each said top surface having a fastener portion;
      iii. said upper top surface fastener portions are spaced apart adapted to assist in fastening there between an electrical fuse of a first size, and
      iv. said lower top surface fastener portions are spaced apart adapted to assist in fastening there between an electrical fuse of a second size:
   g. wherein, when two said elements are mechanically connected adjacently using respective said first and second mechanical connector portions, a width of said base is adapted to space apart the lower top surfaces of adjacent said mechanically connected elements to a spacing that is the same as said spacing between said opposed lower top surfaces in one said element; and
   h. a flat olate conductor adapted to connect one of:
      i. said opposed lower top surfaces in one said element; and
      ii. said adjacent lower top surfaces in said adjacent elements.

2. The expandable distribution block of claim 1, comprising:
   a. first and second holes in respective said input coupling and said output coupling adapted to receive a first gauge of first and second electrically conductive wires, respectively; and
   b. first and second set screws through respective coplanar vertical sides of said input coupling and said output coupling adapted to secure respective first and second said wires in respective said input coupling and said output coupling.

3. The expandable distribution block of claim 2, comprising a wire size adapter adapted to snugly fit in one of said first and said second hole and to receive a second, smaller gauge of wire; and wherein said wire size adapter includes an axial barrel having a transverse opening for receiving said set screw.

4. The expandable distribution block of claim 1, comprising an electrically non-conductive snap-fit cap adapted to snap fit to said base without preventing mechanical connection of two adjacent mechanically connected said bases.

5. The expandable distribution block of claim 1, comprising three or more said elements mechanically connected adjacently using respective said first and second mechanical connector portions.

6. The expandable distribution block of claim 1, comprising first and second parallel side notches proximate respective opposing first and second ends of said flat plate conductor, wherein said flat plate conductor is adapted to be juxtaposed to a second said flat plate conductor such that respective said notches form a fastener opening.

7. The expandable distribution block of claim 5, wherein said at least two said elements mechanically connected adjacently using said first and second mechanical connector portions comprises at least two of:
   a. a flat plate conductor fastened to said opposing first and second extended feet of said opposing input and output couplings in at least one said element of said at least two elements;
   b. a flat plate conductor fastened to adjacent first and second extended feet of said first and second input couplings in adjacent mechanically connected first and second elements of said at least two elements;
   c. a mini-ANL fuse fastened to said opposing first and second extended feet of said opposing input and output couplings in one said element of said at least two elements; and
   d. an ANL fuse fastened to said opposing first and second blocks of said opposing respective input and output couplings in one said element of said at least two elements.

8. The expandable distribution block of claim 5, wherein said at least two said mechanically connected adjacent elements using said first and second mechanical connector portions comprises at least one of:
   a. at least two elements that are not electrically connected;
   b. at least two elements that are electrically connected;
   c. at least two elements that are mechanically connected by at least one dovetail joint;
   d. at least two elements that are mechanically connected by at least four dovetail joints;
   e. at least four mini-ANL fuse fasteners;
   f. at least four ANL fuse fasteners;
   g. at least one countersunk fastener hole through a bottom of each said at least two bases of said at least two elements;
   h. at least one wire, having a first gauge, fastened to one of said input coupling and said output coupling; and
   i. at least one wire having a second gauge, fastened to one of said input coupling and said output coupling.

9. An expandable distribution block for distributing electrical power though direct connections or fused connections, the expandable distribution block comprising:
   a. a generally rectangular electrically non-conductive base having first and second opposed long sides;
   b. at least one first portion of a mechanical connector formed in, and of one piece with, said first long side of said base;

c. at least one second portion of said mechanical connector formed in, and of one piece with, said second long side of said base;
d. a two-level electrical input coupling and similar two-level electrical output coupling mounted in opposed ends of said base, thereby forming an element of said expandable distribution block; and
e. wherein said first and second portions of said mechanical connector are complimentary and mutually engageable between first and second adjacent said bases;
f. each said input coupling and output coupling comprises a block having an upper top surface; and
g. an extended foot that is of one piece with said block and has a lower top surface, each said upper and lower too surface having a fastener portion; and
h. said upper top surface fastener portions are spaced apart adapted to assist in fastening there between a fuse of a first size; and
i said lower too surface fastener portions are spaced apart adapted to assist in fastening there between a fuse of a second size; and
j. wherein, when two said elements are mechanically connected adjacently using respective said first and second mechanical connector portions, a width of said base is adapted to space apart the lower top surfaces of adjacent said mechanically connected elements to a spacing that is the same as said spacing between said opposed lower too surfaces in one said element;
k. a flat plate conductor adapted to connect one of:
 i said opposed lower top surfaces in one said element; and
 ii said adjacent lower too surfaces in said adjacent elements.

10. The expandable distribution block of claim 9, comprising:
a. first and second holes in respective coplanar vertical sides of said input coupling and said output coupling adapted to receive a first gauge of first and second electrically conductive wires;
b. first and second set screws through respective said input coupling and said output coupling adapted to secure said wire in respective said input coupling and said output coupling;
c. a wire size adapter adapted to snugly fit in one of a first and a second said hole and to receive a second, smaller gauge of wire; and
d. wherein said wire size adapter includes an axial barrel having a transverse opening for receiving said set screw.

11. The expandable distribution block of claim 9, comprising an electrically non-conductive snap fit cap adapted to snap fit to said base without preventing mechanical connection of two adjacent bases.

12. The expandable distribution block of claim 9, comprising three or more said elements mechanically connected adjacently using respective said first and second mechanical connector portions.

13. The expandable distribution block of claim 12, comprising first and second parallel side notches proximate respective opposing ends of said flat plate conductor, wherein said flat plate conductor is adapted to be juxtaposed to a second said flat plate conductor such that respective said notches form a fastener opening.

14. The expandable distribution block of claim 13, wherein said two said mechanically connected adjacent elements using respective said first and second mechanical connector portions comprises:

a. at least two of:
 i. a flat plate conductor fastened between said opposing first and second extended feet of said opposing input and output couplings in one said element;
 ii. a flat plate conductor fastened between said first and second extended feet of said respective adjacent first and second input couplings in adjacent, mechanically connected elements;
 iii. a mini-ANL fuse fastened between said opposing first and second extended feet of said respective opposing input and output couplings in one said element; and
 iv. an ANL fuse fastened to said opposing first and second blocks of said respective opposing input and output couplings in one said element; and
b. at least one of:
 i. at least two elements that are not electrically connected;
 ii. at least two elements that are electrically connected;
 iii. at least two elements that are mechanically connected by at least one dovetail joint;
 iv. at least two elements that are mechanically connected by at least four dovetail joints;
 v. at least four mini-ANL fuse fasteners;
 vi. at least four ANL fuse fasteners;
 vii. at least one countersunk fastener hole through the bottom of each said at least two bases of said at least two elements;
 viii. at least one wire, having a first gauge, fastened to one of said input coupling and said output coupling; and
 ix. at least one wire, having a second gauge, fastened to one of said input coupling and said output coupling.

15. An expandable distribution block for distributing electrical power though direct connections and/or fused connections, the expandable distribution block comprising:
a. a generally rectangular electrically non-conductive base having first and second opposed long sides;
b. at least one first portion of a mechanical connector formed in, and of one piece with, said first long side of said base;
c. at least one second portion of said mechanical connector formed in, and of one piece with, said second long side of said base;
d. wherein said first and second portions of said mechanical connector are complimentary and mutually engageable between first and second adjacent said bases;
e. a first two-level electrical input coupling and similar second two-level electrical output coupling mounted in opposed ends of said base, thereby forming an element of said expandable distribution block; and
f. a two-level electrical input coupling and similar two-level electrical output coupling mounted in opposed ends of said base, thereby forming an element of said expandable distribution block; and
g. wherein
 i. each said input coupling and output coupling comprises:
 ii. a block having an upper top surface; and
 iii. an extended foot, that is of one piece with said block, and having a lower top surface;
 iv. wherein each said top surface has a fastener portion;
 v. said upper top surface fastener portions are spaced apart adapted to assist in fastening there between an electrical fuse of a first size; and vi. said lower top surface fastener portions are spaced apart adapted to assist in fastening there between an electrical fuse of a second size; and
h. wherein said at least two said elements mechanically connected adjacently using said first and second mechanical connector portions comprises at least two of:
   i. a flat plate conductor fastened between said opposing first and second extended feet of said opposing input and output couplings in one said element of said at least two elements;
   ii. a flat plate conductor fastened between said first and second extended feet of said respective input couplings in adjacent mechanically connected first and second elements of said at least two elements;
   iii. a mini-ANL fuse fastened between said opposing first and second extended feet of said opposing input and output couplings in one said element of said at least two elements; and
   iv. an ANL fuse fastened between said opposing first and second blocks of said opposing respective input and output couplings in one said element of said at least two elements.

16. The expandable distribution block of claim 13, wherein said at least two said elements mechanically connected adjacently using respective said first and second mechanical connector portions comprises:
   a. at least two of:
      i. a flat plate conductor fastened between said opposing first and second extended feet of said respective opposing input and output couplings in one said element;
      ii. a flat plate conductor fastened between said first and second extended feet of said respective adjacent input couplings in adjacent, mechanically connected elements;
      iii. a mini-ANL fuse fastened between said opposing first and second extended feet of said respective opposing input and output couplings in one said element; and
      iv. an ANL fuse fastened between said opposing first and second blocks of said respective opposing input and output couplings in one said element; and
   b. at least one of:
      i. at least two elements that are not electrically connected;
      ii. at least two elements that are electrically connected;
      iii. at least two elements that are mechanically connected by at least one dovetail joint;
      iv. at least two elements that are mechanically connected by at least four dovetail joints;
      v. at least four mini-ANL fuse fasteners;
      vi. at least four ANL fuse fasteners;
      vii. at least one countersunk fastener hole through the bottom of each said at least two bases of said at least two elements;
      viii. at least one wire, having a first gauge, fastened to one of said input coupling and said output coupling; and
      ix. at least one wire having a second gauge, fastened to one of said input coupling and said output coupling.

\* \* \* \* \*